Patented May 23, 1944

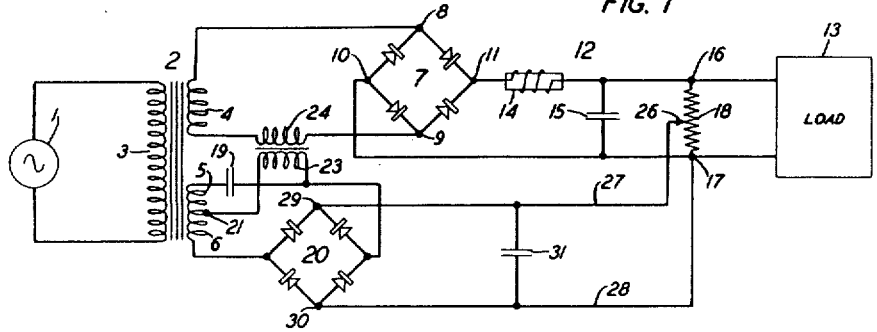
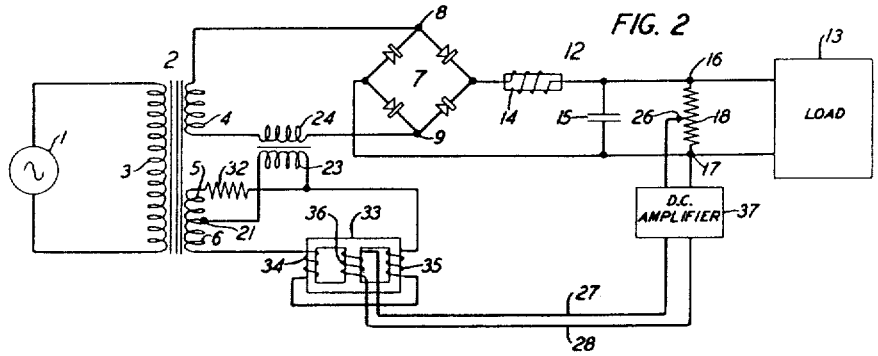
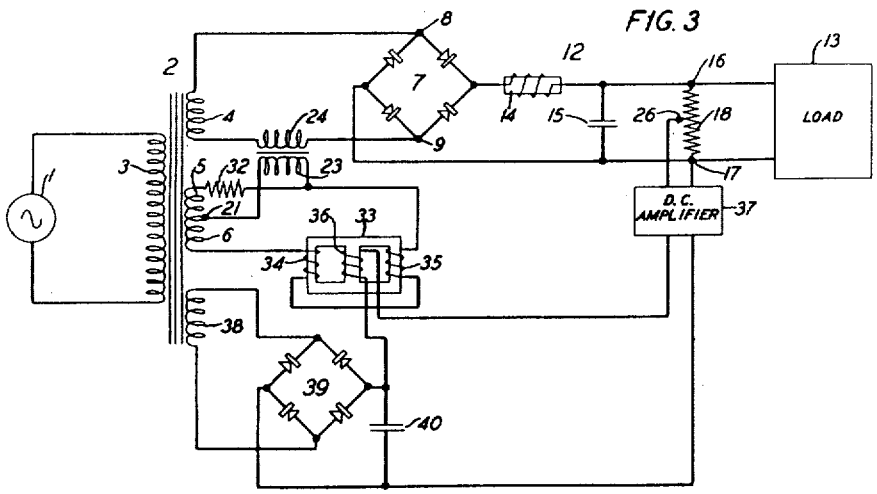

2,349,685

UNITED STATES PATENT OFFICE 2,349,685

RECTIFYING SYSTEM

David E. Trucksess, Summit, N. J., assignor to Bell Telephone Laboratories, Incorporated, New York, N. Y., a corporation of New York Application March 12, 1942, Serial No. 434,346

6 Claims. (Cl. 175—363)

This invention relates to rectifying systems.

An object of the invention is the provision of an inexpensive regulating system for alternating current rectifiers for use under conditions of low voltage and low power.

In accordance with the invention a rectifier of the varistor type is supplied with alternating current energy through a main transformer connected to a source of alternating current. An auxiliary transformer also connects the varistor rectifier to the source of alternating current through a variable bridge circuit which is so controlled by rectified current from the output of the rectifier that the electromotive force derived from the auxiliary transformer aids or opposes the electromotive force from the main transformer in varying degree in such manner as to tend to hold substantially constant the output terminal unidirectional electromotive force supplied by the rectifier to its load circuit.

In the drawing,

Fig. 1 illustrates schematically the circuits of one embodiment of the invention;

Fig. 2 that of an alternative form; and

Fig. 3 that of a third modification.

Referring to Fig. 1, a source 1 of alternating current energy to be rectified is connected by the transformer 2 having a primary 3, a main secondary winding 4 and a split auxiliary winding 5, 6 to a four-arm bridge rectifier 7 of well-known type. The bridge elements are preferably varistors of the selenium or copper oxide types. An alternating electromotive force is impressed by secondary winding 4 upon terminals 8, 9 of the bridge, and from its alternate terminals 10, 11 the output circuit of the rectifier supplies unidirectional current by way of a smoothing filter 12 to a load 13. The load 13 may be an energy consuming or translating device of any kind such as a lamp, heater, storage battery to be charged, or the like. The smoothing filter consists of a suitably designed series choke 14 and a shunt capacitor 15.

Across the load input terminals 16, 17 a potentiometer 18 is connected to provide a unidirectional regulating potential which tends to vary with variations in the alternating electromotive force across primary winding 3 and also with variations in the load energy delivered by secondary winding 4, rectifier bridge 7 and smoothing filter 12 to the load 13.

Auxiliary secondary windings 5 and 6 constitute two arms of a four-arm bridge circuit of which capacitor 19 and auxiliary varistor rectifier 20 are the third and fourth arms, respectively.

Between the normal equal potential points of the bridge is connected the primary winding 23 of a regulating transformer, the secondary winding 24 of which is connected in series with winding 4 in the input circuit of the main varistor rectifier 7. Since the net input electromotive force impressed upon rectifier 7 depends upon the vector sum of the electromotive forces from secondary winding 4 and the regulating transformer winding 24, it is possible, by reversing the latter electromotive force to make it aid or oppose the principal electromotive force at will. Moreover, by causing the auxiliary electromotive force to vary in accordance with the rectified output potential across points 16, 17 of the main rectifier, it is possible to so regulate the input alternating electromotive force applied to the rectifier as to maintain the rectified output potential substantially constant. To do this a variable tap 26 of potentiometer 18 and the terminal 17 are connected by leads 27, 28 to terminals 29 and 30 of the varistor rectifier 20. A smoothing capacitor 31 is connected across leads 27 and 28 to effectively short circuit ripple electromotive forces appearing across terminals 29, 30.

In operation the current in primary winding 23 is the difference between the current supplied by winding 5 to capacitor 19 and that supplied by winding 6 to rectifier 20. If windings 5 and 6 provide equal electromotive forces and if the impedances of capacitor 19 and rectifier 20 are equal the current through winding 23 will be zero. It follows that the magnitude of the current through winding 23 and moreover its phase will depend upon the impedance of rectifier 20. As the impedance of the rectifier increases beyond that of capacitor 19 the current through winding 23 will increase in one direction; as the impedance of rectifier 20 decreases below that of capacitor 19 the current through winding 23 will likewise increase, but its phase will be opposite to that of its normal condition. When, therefore, the impedance of the varistor arm 20 is at its minimum value the primary 23 of the regulating current transformer is essentially connected across the winding 6 and the phase relations are so preselected that the secondary electromotive force of winding 24 adds algebraically with the electromotive force of winding 4 to produce the maximum alternating current electromotive force applied to the main amplifier 7 which then delivers the maximum unidirectional output current. When, on the contrary, the impedance of the varistor 20 is maximum the primary winding 23 is connected effectively to the winding 5 through the capacitor 19 and the secondary electromotive force of secondary winding 14 is then approximately 180 degrees out of phase with the electromotive force induced in winding 4 so that the net electromotive force applied to the main rectifier 7 is the algebraic difference of the two. Under these conditions the rectifier 7 delivers minimum unidirectional output current to the load. Thus the variation in impedance of the varistor 20 provides at times an aiding or boosting electromotive force and at other times an opposing or bucking electromotive force to control the unidirectional output potential of the rectifier.

The impedance of varistor rectifier 20 in the loop paths 6, 20, 23 to alternating currents which the winding 6 impresses upon the loop is dependent upon the unidirectional electromotive force applied over circuit 27, 28 to the terminals 29, 30 of the rectifier 20. If the unidirectional electromotive force applied over leads 27, 28 is of such polarity as to tend to cause current to flow through varistor 20 in its high impedance direction, it will cause the alternating current impedance of the rectifier for currents from winding 6 to increase thus permitting current through capacitor 19 to predominate in the winding 23. When, on the contrary, the rectifier unidirectional potential across points 16, 17 falls in consequence of reduction of the electromotive force applied by source 1 or in consequence of increased potential drops occasioned in the main transformer, main rectifier and smoothing filter by increased current to the load 13, the potential produced across terminals 29, 30 by varistor 20 will exceed that supplied from the potentiometer 18. The varistor 20 will therefore supply unidirectional current over the path 27, 28 to potentiometer 18. Under these conditions varistor 20 will act as a low impedance with respect to electromotive forces from winding 6 and the alternating current in winding 23 will reverse in phase and will increase as the varistor impedance decreases. By choosing the position of the tap 26 properly the system may operate to hold the unidirectional potential across points 16, 17 substantially constant.

In Fig. 2 like elements are designated by the same reference characters as in Fig. 1. The modifications are in the regulating circuit. In lieu of the capacitor 19 of Fig. 1 a fixed resistor 32 is employed and in lieu of varistor 20 a saturable reactor 33 is provided with two windings 34 and 35 associated with the saturating winding 36 on a common magnetic core structure in well-known fashion so that no alternating electromotive force is induced in the saturating winding 36 by the opposed fluxes of winding 34 and 35 but the saturating winding varies the magnetic fields and hence the impedances presented by the windings 34 and 35. If desired, a direct current amplifier 37 of well-known kind may be introduced into the regulating circuit to increase the relative magnitude of the unidirectional potential variations appearing across potentiometer 18. The operation of this circuit will be readily understood without further explanation since the current in the winding 23 will increase and will change in phase exactly as in the case of Fig. 1 with variations in unidirectional potential impressed by potentiometer 18 upon the regulating circuit.

The circuit of Fig. 3 is somewhat more complex but has the advantage of greater flexibility in adjustment for varying conditions. It differs from that of Fig. 2 in the addition of a third secondary winding 38 to the transformer 2. The winding 38 is directly connected to two terminals of a four-arm varistor rectifier 39 and the rectified potential appearing in the alternate terminals of varistor 39 is introduced serially into the regulating circuit of the reactor 33. The circuit is so designed that the unidirectional output electromotive force of the rectifier 39 is opposed in the regulating circuit to the output electromotive force delivered by the direct current amplifier 37. Consequently, the resultant current that flows through the saturating winding 36 of reactor 33 undergoes a relatively greater change and so likewise does the saturation of the reactor. Thus by comparing the unidirectional electromotive force of rectifier 39, which reflects the electromotive force of winding 3, with the unidirectional potential derived from the potentiometer, which reflects the effect of varying load conditions, a very much greater change in the saturating current may be had with a small change in the unidirectional output electromotive force applied to the main rectifier 7 to the load 13. Expressed somewhat differently the variation in the saturation current is more than proportional to the variation in potential of the rectified output current at the input as measured at the terminals of the load. A large capacitor 40 functions in the circuit as does capacitor 31 of Fig. 1 to reduce ripples appearing across the output of the auxiliary rectifier.

What is claimed is:

1. A self-regulating rectifying system for converting alternating current energy into unidirectional current energy comprising a rectifier having an alternating current input circuit and unidirectional current output circuit including terminals to which a unidirectional current load may be connected, alternating potential regulating means connected in the input circuit to cause an alternating electromotive force to be applied thereto to augment or oppose the electromotive force applied to the rectifier input circuit as the rectified unidirectional potential across the output circuit terminals falls or rises respectively and means electrically connected to the output terminals and connected in energy control relation to the alternating potential regulating means for reversing the phase of the alternating electromotive force applied by the regulating means whenever the load potential of the rectified unidirectional current passes through a predetermined normal value whereby the unidirectional potential difference between the output terminals tends to remain substantially constant.

2. Apparatus for converting the energy of alternating current into unidirectional current energy of substantially constant potential comprising a rectifier, input terminals and output terminals connected thereto, an input circuit connected to the input terminals and including means for impressing on the rectifier a main alternating current electromotive force to be rectified and an auxiliary electro-motive force to aid or oppose the main electromotive force, a source of auxiliary alternating current electromotive force, a four-arm bridge circuit connecting the source to the means for applying the auxiliary electromotive force to the input circuit, a path connected across the output circuit terminals of the rectifier to receive unidirectional current therefrom and also including one arm of the four-arm bridge, said included bridge arm having an impedance which varies with electric current therethrough whereby a variation in the output terminal potential of the rectifier tends to alter the auxiliary alternating electromotive force supplied from the source of auxiliary current through the bridge to the input circuit of the rectifier.

3. In a system for rectifying alternating current energy and regulating the potential of the output unidirectional current, a rectifier, an input circuit and an output circuit each connected thereto, a source of alternating current to be rectified, a main energy transfer means connecting the source to the input circuit to apply an electromotive force to be rectified, an auxiliary energy transfer means connecting the source to the input circuit to apply a controlling electromotive force thereto in series with the electromotive force to be rectified, said auxiliary connecting means including a varistor, and means connected to two points in the output circuit across which constant potential is desired and also connected to the varistor to apply to the varistor energy varying with the unidirectional output potential to cause the auxiliary energy transfer means to apply a controlling electromotive force to the input circuit which is of such phase as to aid the electromotive force applied by the main energy transfer means when the unidirectional output potential is below a predetermined desired magnitude and to oppose the electromotive force applied by the main energy transfer means when the unidirectional output potential is above the predetermined desired magnitude.

4. A rectifying system comprising a rectifying device having input terminals and output terminals, a winding in which an alternating electromotive force to be rectified may be induced, a secondary winding in which a control electromotive force may be induced, means connecting said windings in series to said input terminals, a source of control energy, a four-arm bridge connecting said source to said secondary winding, one arm of the bridge comprising a saturable reactor, and means connected to said output terminals and to the reactor to cause the saturation of the reactor to vary with the potential across said output terminals whereby the control energy electromotive force impressed upon said secondary winding from the source of control energy tends to cause the unidirectional potential across the output terminals to remain substantially constant.

5. A rectifying system comprising a rectifier, input terminals and output terminals connected thereto, a circuit connecting a source of alternating current to the input terminals, and means for maintaining substantially constant the potential of the unidirectional output current as measured across the output terminals of the rectifier said means comprising a four-arm bridge constituting the energy transfer path of the connecting circuit, one arm of the bridge comprising a saturable reactor and a varistor connected in a path linking the output terminals and the saturable reactor to cause the energy transfer characteristic of the connecting circuit to vary with the unidirectional potential across the output terminals.

6. In combination, a rectifier having input terminals and output terminals, a source of alternating current energy, means connecting the source to the input terminals of the rectifier to apply an electromotive force to be rectified, means also connecting the source to the rectifier for supplying a control electromotive force of variable magnitude and of reversible phase thereto and a controlling circuit connecting the output terminals of the rectifier to the second means to determine the magnitude and phase of the control electromotive force, said controlling circuit including means for deriving from the output terminals a unidirectional potential dependent upon the rectified output potential and including in series opposing relation thereto a rectifier receiving alternating current energy from said source whereby the resultant current in the controlling circuit varies in a manner more than proportional to the rectified output potential.

DAVID E. TRUCKSESS.